(12) United States Patent
Aizono (10) Patent No.: US 9,600,820 B2
(45) Date of Patent: Mar. 21, 2017

(54) IMAGE FORMING APPARATUS, METHOD FOR CONTROLLING IMAGE FORMING APPARATUS, AND STORAGE MEDIUM (71) Applicant: CANON KABUSHIKI KAISHA, Tokyo (JP)

(72) Inventor: Keisuke Aizono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/577,868

(22) Filed: Dec. 19, 2014

(65) Prior Publication Data
US 2015/0181065 A1    Jun. 25, 2015

(30) Foreign Application Priority Data

Dec. 25, 2013 (JP) ................. 2013-267146

(51) Int. Cl.
*H04N 1/00* (2006.01)
*G06Q 20/40* (2012.01)
*G06Q 20/34* (2012.01)
*H04N 1/32* (2006.01)
*G06Q 20/32* (2012.01)
*H04N 1/34* (2006.01)
(Continued)

(52) U.S. Cl.
CPC ......... *G06Q 20/409* (2013.01); *G06Q 20/085* (2013.01); *G06Q 20/18* (2013.01); *G06Q 20/40* (2013.01); *G07F 9/026* (2013.01); *G07F 17/26* (2013.01); *H04N 1/00511* (2013.01); *H04N 1/34* (2013.01); *H04N 1/4413* (2013.01); *H04N 1/4426* (2013.01)

(58) Field of Classification Search
CPC .. G06Q 20/327; G06Q 20/352; G06Q 20/409; H04N 1/00511; H04N 1/34; H04N 1/4413; H04N 1/4426
See application file for complete search history.

(56) References Cited

U.S. PATENT DOCUMENTS

2010/0118324 A1* 5/2010 Tagawa .................... H04N 1/00
358/1.13
2010/0318582 A1* 12/2010 Nimura ................. G06Q 10/06
707/805
(Continued)

FOREIGN PATENT DOCUMENTS

JP    2011-059448 A    3/2011

*Primary Examiner* — Iriana Cruz
(74) *Attorney, Agent, or Firm* — Canon U.S.A., Inc. IP Division (57) ABSTRACT An image forming apparatus includes a first login unit configured to perform login processing on condition that a user is authenticated based on authentication information input by the user, and a second login unit configured to perform login processing on condition that money is inserted by a user. The apparatus further includes an image forming unit configured to perform image formation according to an instruction from a user who has logged in via the first login unit or the second login unit, and a detection unit configured to detect occurrence of an error that requires maintenance, during the image formation performed by the image forming unit. The apparatus further includes a display unit configured to display a different screen depending on whether the user has logged in via the first login unit or the second login unit, when the occurrence of the error is detected by the detection unit.

5 Claims, 10 Drawing Sheets (51) Int. Cl.
*H04N 1/44* (2006.01)
*G06Q 20/08* (2012.01)
*G07F 17/26* (2006.01)
*G06Q 20/18* (2012.01)
*G07F 9/02* (2006.01)

(56) References Cited

U.S. PATENT DOCUMENTS

2011/0058210 A1* 3/2011 Aizono .................... H04L 9/32
                                                    358/1.14
2012/0019873 A1* 1/2012 Tian .................. H04N 1/33346
                                                    358/442
2013/0141743 A1* 6/2013 Miyazawa ......... H04N 1/00095
                                                    358/1.13

* cited by examiner

| | ID | PASSWORD | AUTHORITY |
|---|---|---|---|
| 1 | admin | abcd | SYSTEM ADMINISTRATOR |
| 2 | user01 | 0101 | GENERAL USER |
| 3 | user02 | 0202 | GENERAL USER |
| 4 | user03 | 0303 | GENERAL USER |
| 5 | coin | -- | COIN USER |

IMAGE FORMING APPARATUS, METHOD FOR CONTROLLING IMAGE FORMING APPARATUS, AND STORAGE MEDIUM

BACKGROUND OF THE INVENTION

Field of the Invention

The present invention relates to an image forming apparatus capable of forming an image according to an instruction provided by a user having inserted money into a charging apparatus or a user authenticated by an authentication unit.

Description of the Related Art

In a place such as a convenience store, an image forming apparatus is usually installed to offer a copy service and a print service. In such an operation form, the image forming apparatus is connected to a charging management apparatus such as a coin vendor, and a customer can carry out a copy job or a print job by putting money into the coin vendor. In addition, in the image forming apparatus connected to the coin vendor, an administrator such as a salesclerk can carry out a copy job or a print job without putting money thereinto, by changing a mode of the coin vendor with a key or the like.

In recent years, an operation form in which both customers and staff use a single image forming apparatus has been considered. Such an operation form may be applied to places such as libraries and cram schools. The image forming apparatus in this operation form is expected to have a mechanism for allowing both the customers and the staff to use the image forming apparatus without inconvenience.

Japanese Patent Application Laid-Open No. 2011-059448 discusses an image forming apparatus capable of accepting login with an identification (ID) and a password via an authentication apparatus, and also capable of determining receipt of money by a coin vendor as login.

Incidentally, the image forming apparatus to which both the customers and the staff can log in needs to display a screen for handling an error, such as running out of sheet, running out of toner, and a paper jam, when that error occurs.

SUMMARY OF THE INVENTION

The present invention is directed to an image forming apparatus that displays a different screen depending on a logged-in user.

According to an aspect of the present invention, an image forming apparatus includes a first login unit configured to perform login processing on condition that a user is authenticated based on authentication information input by the user, a second login unit configured to perform login processing on condition that money is inserted by a user, an image forming unit configured to perform image formation according to an instruction from a user who has logged in via the first login unit or via the second login unit, a detection unit configured to detect occurrence of an error that requires maintenance, during the image formation performed by the image forming unit, and a display unit configured to display a different screen depending on whether the user has logged in via the first login unit or via the second login unit, when the occurrence of the error is detected by the detection unit.

According to an embodiment of the present invention, when an error that requires maintenance occurs, a screen suitable for a logged-in user can be displayed.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Hardware Configuration of Image Forming Apparatus>

Figure 1:
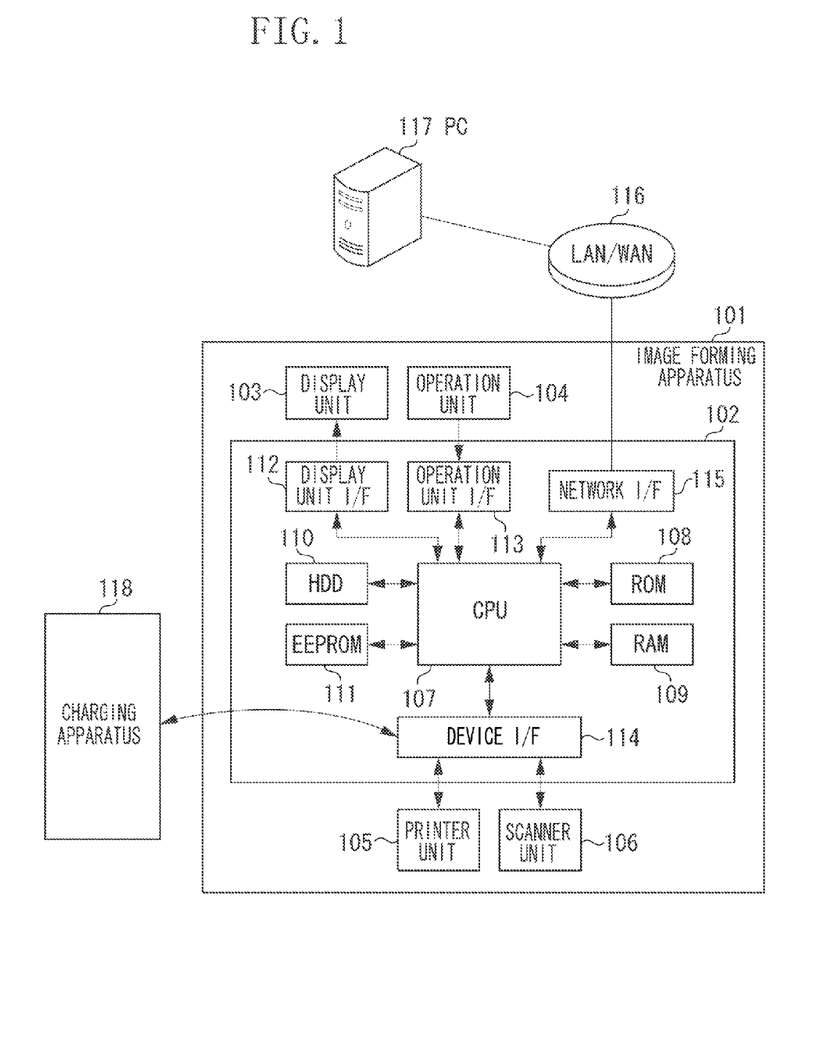
FIG. 1 is a block diagram illustrating a hardware configuration of an image forming apparatus.

FIG. 1 is a block diagram illustrating a hardware configuration of an image forming apparatus 101 according to an exemplary embodiment.

The image forming apparatus 101 includes a controller unit 102, a display unit 103, an operation unit 104, a printer unit 105, and a scanner unit 106.

The display unit 103 includes a light emitting diode (LED) and a liquid crystal display, and displays contents of a user operation and an internal state of the image forming apparatus 101. The operation unit 104 receives an operation from a user. The operation unit 104 may not only include a plurality of operation buttons, but also be implemented as a touch display together with the display unit 103.

The printer unit 105 prints an image on a sheet by using an electrophotographic method. The printer unit 105 includes a sheet feeding mechanism for taking a sheet from a sheet tray, and a mechanism for transferring an image onto the sheet and fixing the image. The printer unit 105 further includes a mechanism for discharging the sheet from the inside to the outside of the image forming apparatus 101. The printer unit 105 also has a finishing mechanism as an additional function. The finishing mechanism may be called a finisher. Examples of the finishing mechanism include a mechanism for collating printed documents, a mechanism for stapling printed documents, and a mechanism for folding printed documents. Upon receiving a print instruction from the controller unit 102, the printer unit 105 prints an image on a sheet based on image data transmitted from the controller unit 102. The printer unit 105 is connected to the controller unit 102 via a device interface (I/F) 114.

The scanner unit 106 emits light to a document and reads reflected light as digital data. The scanner unit 106 includes a document table glass used to read each side of the document. Further, an auto document feeder (ADF) is attached to the scanner unit 106, to allow successive reading of two or more stacked documents. Upon receiving a scan instruction from the controller unit 102, the scanner unit 106 performs scan operation, and transmits image data obtained by the scan operation to the controller unit 102. The scanner unit 106 is connected to the controller unit 102 via the device I/F 114.

The controller unit 102 includes a central processing unit (CPU) 107, a read only memory (ROM) 108, a random access memory (RAM) 109, a hard disk drive (HDD) 110, an electrically erasable programmable ROM (EEPROM) 111, a display unit I/F 112, an operation unit I/F 113, and the device I/F 114. The CPU 107 is a medium for executing a control program and built in the image forming apparatus 101. The CPU 107 controls operation of devices connected to the controller unit 102 via each I/F and storage medium memory. The ROM 108 stores a boot program necessary for system startup. The RAM 109 is a volatile memory, and serves as a work memory necessary for execution of the control program. The HDD 110 is a storage medium such as a magnetic disk, and stores the control program and image data. The EEPROM 111 is a nonvolatile memory, and stores set values necessary for execution of the control program. The EEPROM 111 also stores IDs and passwords necessary for user management.

The device I/F 114 controls input and output to/from the devices (the printer unit 105, the scanner unit 106, and a charging apparatus 118) connected to the controller unit 102. The device I/F 114 may be implemented as a bus structure capable of connecting to a plurality of devices. Alternatively, the device I/F 114 may be divided into a plurality of I/Fs each provided for a different one of the connected devices. The display unit I/F 112 outputs control information to the display unit 103. The operation unit I/F 113 receives input information from the operation unit 104.

The image forming apparatus 101 connects to a local area network/wide area network (LAN/WAN) 116 via a network I/F 115, and receives a print job from a personal computer (PC) 117 connected to the LAN/WAN 116.

Further, the image forming apparatus 101 communicates with the charging apparatus 118 via the device I/F 114. The charging apparatus 118 is a charge collection apparatus for collecting the amount of money charged to a user of the image forming apparatus 101. In the present exemplary embodiment, a coin vendor will be described as the charging apparatus 118. The coin vendor receives cash (paper money and coins) from the user. Alternatively, the charging apparatus 118 may be, for example, a charge collection apparatus that collects a charge via a cash card, a prepaid card, electronic money, or the like. When the image forming apparatus 101 is used based on a charge collected using the charging apparatus 118, the CPU 107 calculates the amount of money to be charged to the user according to the number of sheets to be printed, sheet size, color mode, and the like for a job input by the user. The charging apparatus 118 collects the calculated amount of money from the user.

<Software Configuration of Image Forming Apparatus>

Figure 2:
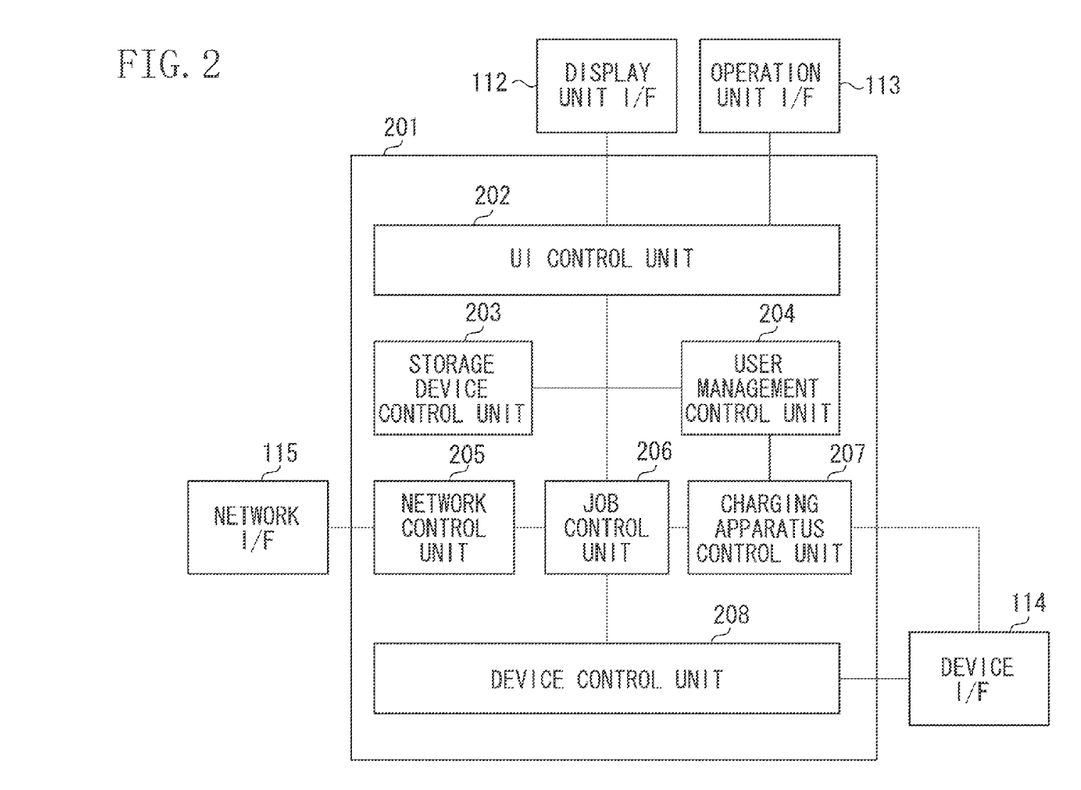
FIG. 2 is a block diagram illustrating a software configuration of the image forming apparatus.

A software configuration of the image forming apparatus 101 will be described with reference to FIG. 2.

The CPU 107 executes controller software 201 by loading the control program from the HDD 110 into the RAM 109. The controller software 201 includes a user interface (UI) control unit 202, a storage device control unit 203, a user management control unit 204, a network control unit 205, a job control unit 206, a charging apparatus control unit 207, and a device control unit 208.

The UI control unit 202 causes a screen to be displayed to the user via the display unit I/F 112. In addition, the UI control unit 202 receives input from the user via the operation unit I/F 113. The UI control unit 202 receives an ID and a password input by the user, and notifies the user management control unit 204 of a login request. The UI control unit 202 also receives various kinds of settings for the image forming apparatus 101, and notifies the storage device control unit 203 of set values.

The storage device control unit 203 reads and writes image data and various kinds of set values from and to the HDD 110 and the EEPROM 111 according to reading and writing instructions from other control unit.

Upon being notified of the login request by the UI control unit 202, the user management control unit 204 determines whether the user is authorized, based on a user management table held in the storage device control unit 203, and performs login processing. The user management table and the login processing will be described below. The user management control unit 204 also receives a notification of a login request provided by the charging apparatus control unit 207, and performs login processing.

The network control unit 205 transmits and receives data to and from the LAN/WAN 116 via the network I/F 115. The network control unit 205 also temporarily receives a print job from the PC 117, and makes a job entry into the job control unit 206.

The job control unit 206 receives an entry of a job from the UI control unit 202 or the network control unit 205, and executes the job by obtaining various kinds of settings held in the storage device control unit 203 and login information held in the user management control unit 204. In job execution processing, the job control unit 206 notifies the device control unit 208 of a print instruction and a scan instruction. Further, the job control unit 206 notifies the charging apparatus control unit 207 of information necessary for charging.

The charging apparatus control unit 207 communicates with the charging apparatus 118 via the device I/F 114. Upon receiving a notification of the inserted amount of money from the charging apparatus 118, the charging apparatus control unit 207 notifies the user management control unit 204 of a login request. Further, upon receiving information necessary for charging from the job control unit 206, the charging apparatus control unit 207 calculates the required amount of money, and issues a deduction instruction to the charging apparatus 118.

The device control unit 208 communicates with the printer unit 105 and the scanner unit 106 via the device I/F 114. Upon receiving a print instruction and a scan instruction from the job control unit 206, the device control unit 208 causes the printer unit 105 to start print operation and the scanner unit 106 to start scanner operation. Further, the device control unit 208 notifies the job control unit 206 of a situation that occurs during operation of a device.

<Details of Login Processing>

Figure 3:
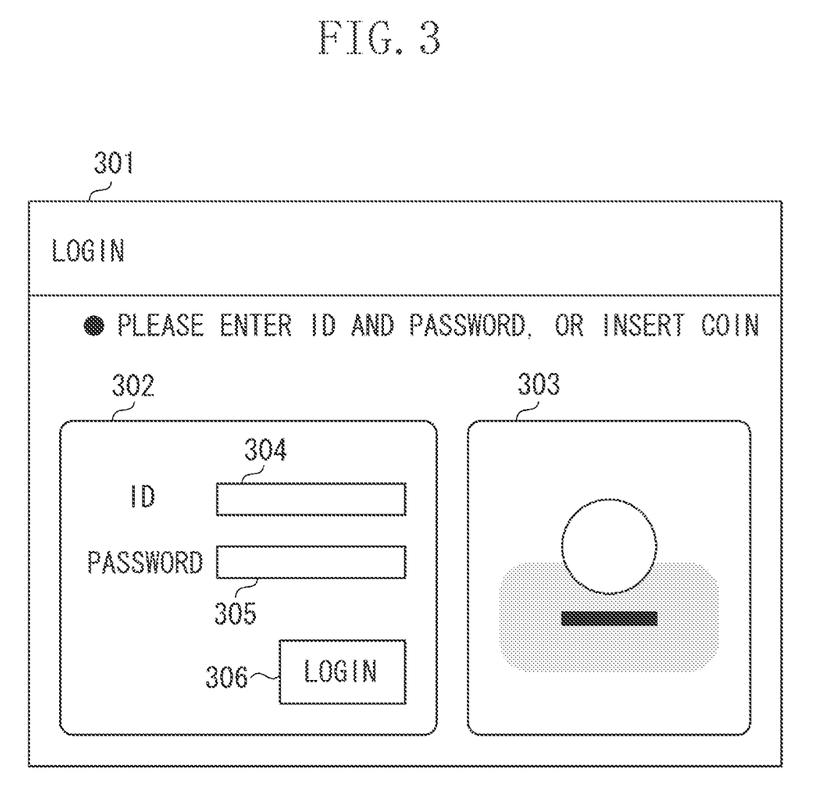
FIG. 3 is a login screen displayed on an operation unit.

FIG. 3 illustrates an example of a login screen displayed on the operation unit 104.

The UI control unit 202 performs processing on a login screen. A login screen 301 includes an ID/password input area 302 and a coin insertion display area 303.

The ID/password input area 302 includes an ID input field 304, a password input field 305, and a login button 306. The ID input field 304 and the password input field 305 receive a user ID and a password as authentication information, respectively. When detecting a press of the login button 306, the UI control unit 202 notifies the user management control unit 204 of the authentication information input in the ID input field 304 and the password input field 305, and starts login processing. Further, pressing of the login button 306 may be disabled when the ID input field 304 or the password input field 305 is blank.

The coin insertion display area 303 indicates that the user can log in on condition that a coin is inserted. The coin insertion display area 303 displays information suitable for how the charging apparatus 118 is used. For example, when the charging apparatus 118 is to accept a prepaid card, the coin insertion display area 303 displays an image of a card, together with a message saying "please insert a prepaid card."

Next, the ID and the password to be input in the ID input field 304 and the password input field 305, respectively, will be described.

Figure 4:
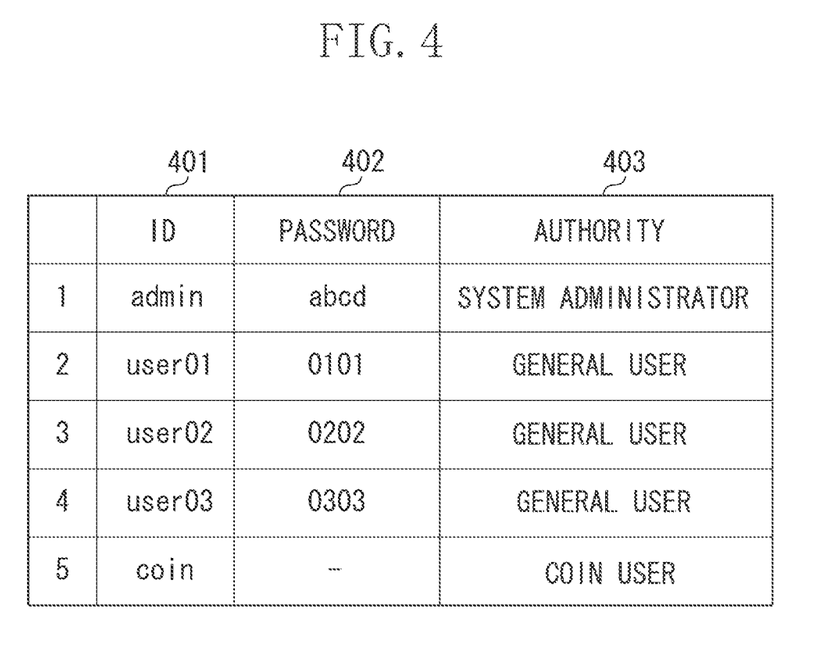
FIG. 4 is a conceptual diagram of a user management table.

FIG. 4 is a conceptual diagram of the user management table. The user management table is held in the EEPROM 111. The user management table contains information including an ID 401, a password 402, and authority 403. The user management control unit 204 obtains the user management table via the storage device control unit 203 when necessary.

The ID 401 is a value used to uniquely identify a user, and the password 402 is a value used to determine whether a user is authorized. A specific ID is reserved for login from the charging apparatus 118, and there is no password for this ID. In the present exemplary embodiment, an ID indicated by "coin" corresponds to this specific ID. Further, the authority 403 is set for each ID. In the present exemplary embodiment, there are three types of authority, which are set for a system administrator, a general user, and a coin user. In the present exemplary embodiment, the system administrator has the authority higher than the authority of the general user, and the general user has the authority higher than the authority of the coin user. The authority of the coin user is set for a user who logs in by inserting money into the charging apparatus 118.

The system administrator has the authority as an administrator who administers the image forming apparatus 101. For example, the system administrator has the authority to register an account of a user who can use the image forming apparatus 101, and to perform various kinds of settings in the image forming apparatus 101. Only a user having the authority of the system administrator can perform settings illustrated in FIGS. 7A to 7C to be described below. In addition, the system administrator also has the authority to use a copy service and a print service provided by the image forming apparatus 101.

The general user has the authority to use the copy service and the print service provided by the image forming apparatus 101. However, the general user does not have the authority as the administrator and therefore, for example, cannot register a user account and perform setting of the image forming apparatus 101.

The coin user receives fewer services that allow use of the image forming apparatus 101 than the services available to the general user. For example, the coin user is under such a constraint that the coin user is allowed to use the copy service but is not allowed to use the print service.

<Login Processing>

Figure 5:
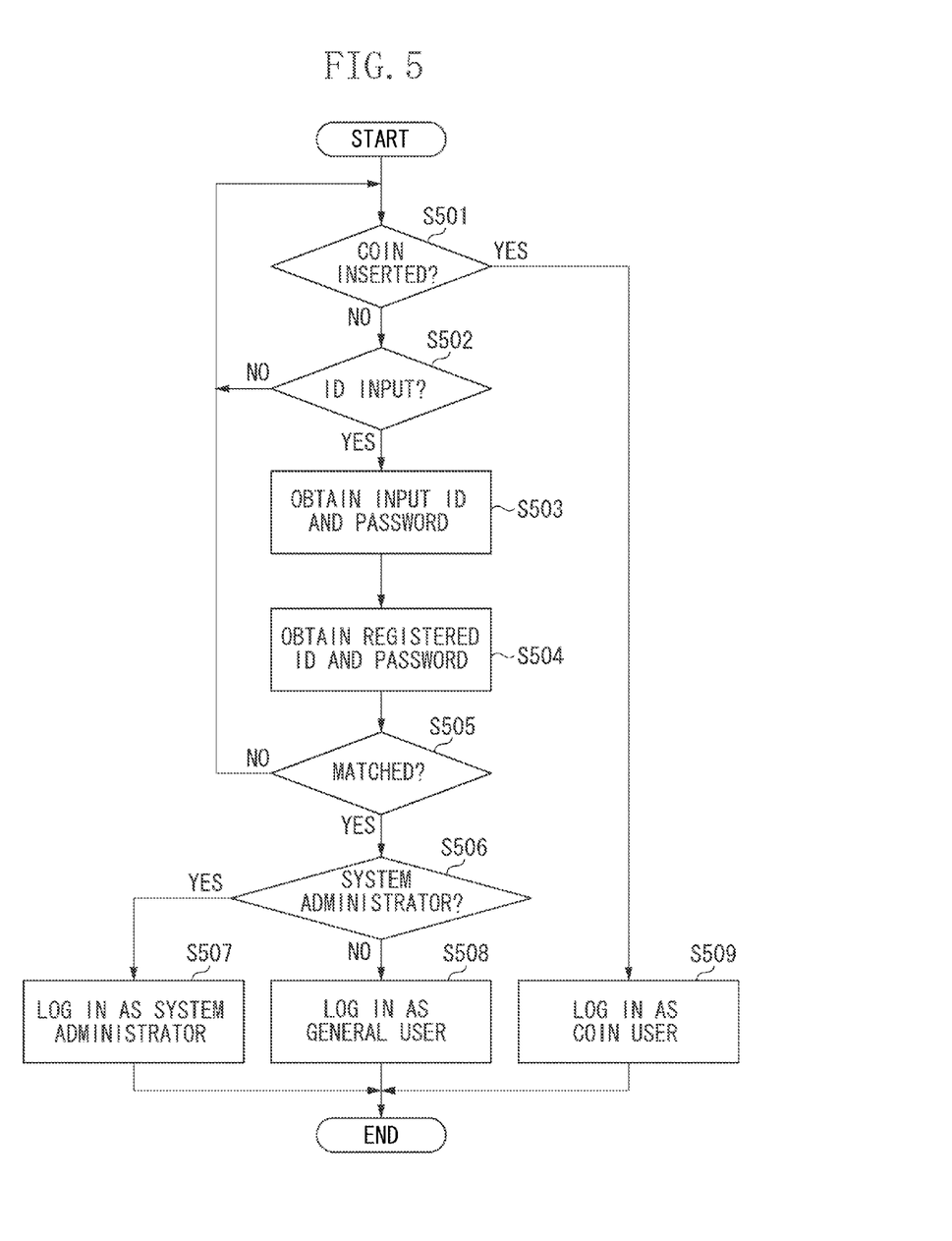
FIG. 5 is a flowchart of login processing.

FIG. 5 is a flowchart illustrating the login processing. The CPU 107 executes the control program loaded from the HDD 110 into the RAM 109, to implement the flow in FIG. 5.

First, in step S501, the CPU 107 determines whether a coin is inserted into the charging apparatus 118. When a coin is inserted (YES in step S501), the CPU 107 determines that an instruction is issued to log in as the coin user, and proceeds to step S509. In step S509, the CPU 107 performs the login processing for the coin user (ID: "coin"). Further, based on the authority of the coin user, the CPU 107 causes the image forming apparatus 101 to become ready to use. On the other hand, when a coin is not inserted (NO in step S501), the CPU 107 proceeds to step S502. In step S502, the CPU 107 determines whether a notification of a login request is received from the UI control unit 202. More specifically, the CPU 107 determines whether an ID and a password are input by the user as the authentication information via the login screen 301 illustrated in FIG. 3, which is displayed on the display unit 103. When the CPU 107 determines that an ID and a password are not input by the user (NO in step S502), the CPU 107 returns to step S501. When the CPU 107 determines that an ID and a password are input by the user (YES in step S502), the CPU 107 proceeds to step S503. In step S503, the CPU 107 obtains the input ID and password. Then, in step S504, the CPU 107 obtains the user management table stored in the EEPROM 111. Next, in step S505, the CPU 107 compares the input ID and password with IDs and passwords in the user management table, respectively to determine whether there is a match for both the ID and the password. When there is no match (NO in step S505), the CPU 107 returns to step S501, assuming that the login has failed. When there is a match (YES in step S505), the CPU 107 proceeds to step S506, assuming that the login has succeeded. In step S506, the CPU 107 determines whether the authority corresponding to the input user ID is the authority of the system administrator or the authority of the general user. When the result is the authority of the system administrator (YES in step S506), the CPU 107 proceeds to step S507. In step S507, the CPU 107 performs the login processing for the system administrator. The CPU 107 then causes the image forming apparatus 101 to become ready to use, based on the authority of the system administrator. When the result is not the authority of the system administrator, in other words, the result is the authority of the general user (NO in step S506), the CPU 107 proceeds to step S508. In step S508, the CPU 107 performs the login processing for the general user. The CPU 107 then causes the image forming apparatus 101 to become ready to use, based on the authority of the general user. The login in any of steps S507, S508, and S509 completes the login processing.

The user management control unit 204 stores, in the HDD 110 or the EEPROM 111, information about the user that has logged in step S507, S508, or S509 until the user logs out.

According to the present exemplary embodiment, the user ID and the password, which are input via the login screen 301 (illustrated in FIG. 3) displayed on the display unit 103, have been described as an example of the authentication information. However, the present exemplary embodiment is not limited to this example. For example, a noncontact integrated circuit (IC) card reader may be connected to the image forming apparatus 101 to input the authentication information via this IC card reader. In this case, the user enters a card ID instead of entering the user ID. In addition, face recognition may be performed using a camera connected to the image forming apparatus 101.

<Logout Processing>

Figure 6:
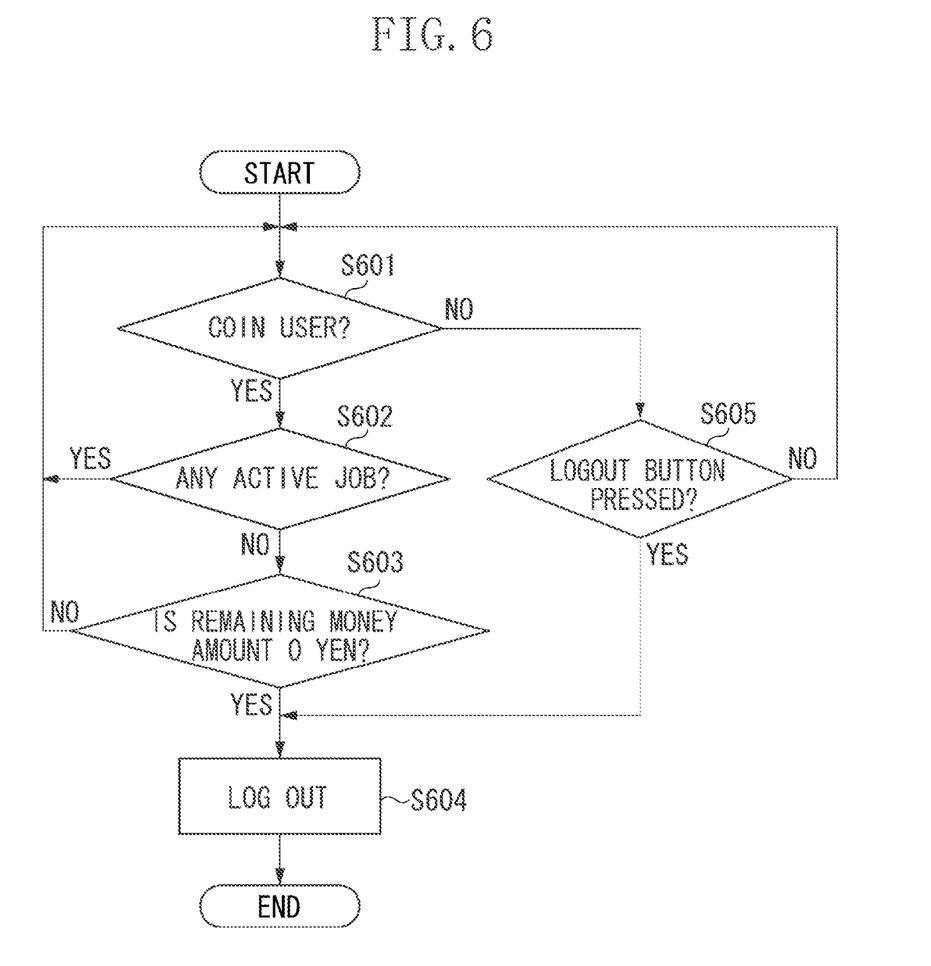
FIG. 6 is a flowchart of logout processing.

FIG. 6 is a flowchart of logout processing. The CPU 107 executes the control program (see FIG. 2) loaded from the HDD 110 into the RAM 109, to implement the flow in FIG. 6.

First, in step S601, the CPU 107 determines whether the current logged-in user is the coin user. When the current logged-in user is a non-coin user, namely, a user authenticated by an authentication unit (NO in step S601), the CPU 107 proceeds to step S605. In step S605, the CPU 107 determines whether a logout notification is received from the UI control unit 202. In other words, the CPU 107 determines whether a logout button on an operation screen displayed on the display unit 103 or a logout button provided on the operation unit 104 is pressed by the user. When the CPU 107 determines that the logout button is pressed (YES in step S605), the CPU 107 proceeds to step S604. In step S604, the CPU 107 performs the logout processing. When the CPU 107 determines that the logout button is not pressed (NO in step S605), the CPU 107 returns to step S601.

When the current logged-in user is a coin user (YES in step S601), the CPU 107 proceeds to step S602. In step S602, the CPU 107 determines whether there is any active job for the current coin user. If a logout occurs during execution of a job for the coin user, money may not be correctly deducted when the coin user logs in again. For this reason, a logout during the execution is prohibited. Therefore, when there is any active job (YES in step S602), the CPU 107 returns to step S601.

When there is no active job (NO in step S602), the CPU 107 proceeds to step S603. In step S603, the CPU 107 obtains, from the charging apparatus control unit 207, information about the remaining amount of money inserted into the charging apparatus 118, and determines whether the remaining amount of money is 0 yen. When the remaining amount of money is 0 yen (YES in step S603), the CPU 107 determines that the processing for the coin user is completed, and proceeds to step S604. In step S604, the CPU 107 performs a logout. When the remaining amount of money is not 0 yen (NO in step S603), another job may be successively entered, and therefore the CPU 107 returns to step S601. When there is money remaining, return processing is performed so that the inserted amount of money becomes 0 yen, and therefore the CPU 107 performs a logout.

After the logout, the user management control unit 204 can receive the next login processing.

<Maintenance Display>

Figure 7A:
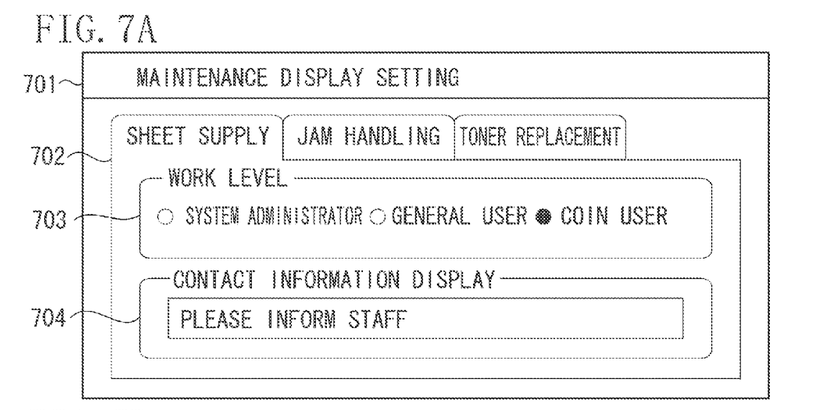
FIGS. 7A, 7B, and 7C each illustrate a maintenance display setting screen.
Figure 7B:
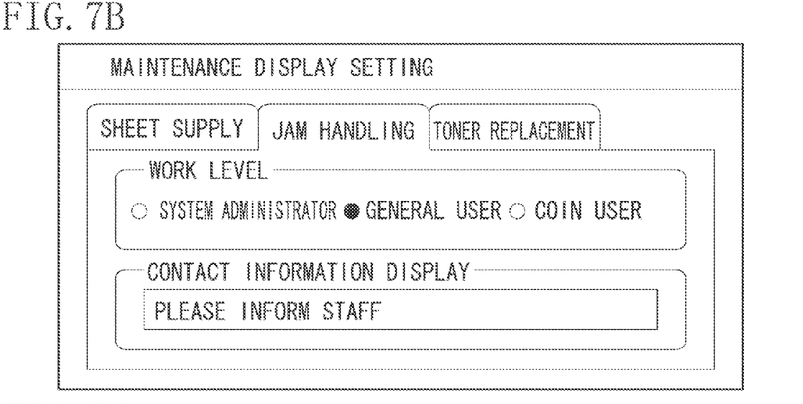
Figure 7C:
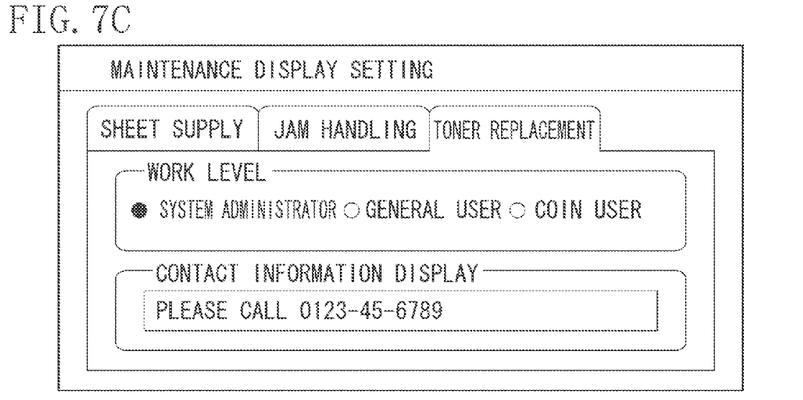

FIGS. 7A, 7B, and 7C each illustrate an example of a maintenance display setting screen displayed on the display unit 103.

The UI control unit 202 performs processing for the maintenance display setting screen. A maintenance display setting screen 701 includes a maintenance work item 702, a work level 703, and a contact information display 704.

The maintenance work item 702 is a sheet for each type of maintenance work. In the present exemplary embodiment, three types of work can be set as the maintenance work item 702, which are "sheet supply", "jam handling", and "toner replacement".

The work level 703 is provided to set which user is authorized to perform the maintenance work. When "coin user" is set as the work level 703, the work level 703 includes the general user and the system administrator. When "general user" is set as the work level 703, the work level 703 includes the system administrator.

FIG. 7A illustrates which user is authorized to perform the maintenance work to handle running out of sheets. In this example, "coin user" is set as the work level 703. This indicates that the coin user can perform the sheet supply work when "coin user" is set as the work level 703. In other words, the coin user having inserted money into the charging apparatus 118 and the user authenticated by the authentication unit can both perform the sheet supply work.

The contact information display 704 is provided to set a message to be displayed when the authority of a logged-in user is not included in the setting of the work level 703. The message may be any message input by the system administrator. For example, it is assumed that "general user" is set as the work level 703. Then, when an error of running out of sheets occurs during login of the coin user, a set message (e.g., "Please inform staff.") is displayed instead of displaying a maintenance screen for the sheet supply work.

When the coin user is set as the work level 703, the authority of every user is included in the setting of the work level 703. However, a message about contact information may be displayed and therefore the contact information display 704 can be set (details will be described with reference to a flowchart of FIG. 9).

FIG. 7B illustrates a case in which a user having the authority of the general user or higher can perform the jam handling. When a jam occurs during login of the coin user, a message appears saying "Please contact staff."

FIG. 7C illustrates a case in which only a user having the authority of the system administrator can perform the toner replacement. When the toner runs out during login of the coin user or the general user, a message appears saying "Please call 0123-45-6789."

<Flowchart Before Display of Maintenance Screen>

Figure 8:
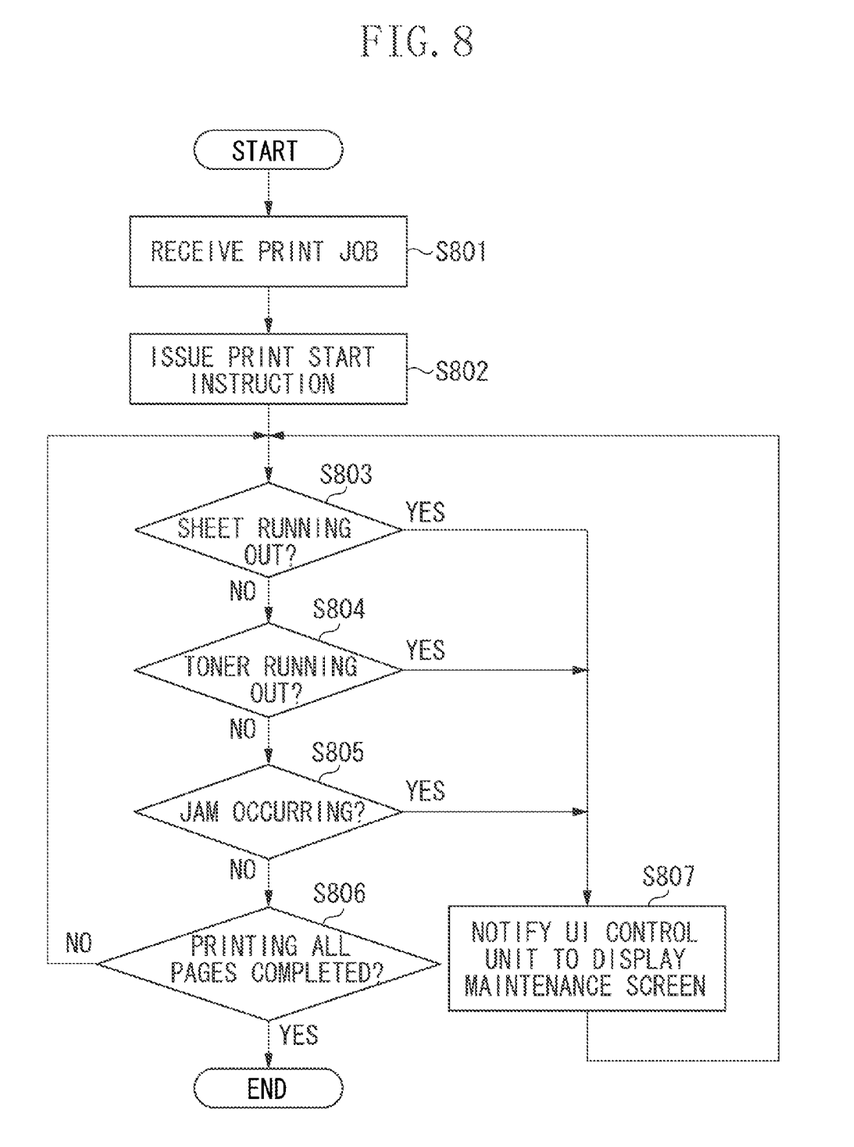
FIG. 8 is a flowchart of print processing.

FIG. 8 is a flowchart of print processing. The CPU 107 executes the control program (see FIG. 2) logged from the HDD 110 into the RAM 109, to implement the flow in FIG. 8.

First, in step S801, the CPU 107 receives a print job. Next, in step S802, the CPU 107 causes the printer unit 105 to start the print processing by issuing a print start instruction.

Subsequently, in or after step S803, the CPU 107 obtains a status of the printer unit 105 from the device control unit 208, and determines whether a type of error that requires maintenance has occurred.

In step S803, the CPU 107 determines whether an error of running out of sheets has occurred. In step S804, the CPU 107 determines whether an error of running out of toner has occurred. In step S805, the CPU 107 determines whether a jam error has occurred. When the CPU 107 determines that a type of error that requires maintenance has occurred (YES in any of steps S803 to S805), the CPU 107 proceeds to step S807. In step S807, the CPU 107 transmits a screen display notification to the UI control unit 202 to perform a display on the display unit 103. Details of step S807 will be described with reference to a flowchart illustrated in FIG. 9.

Finally, in step S806, the CPU 107 determines whether the printer unit 105 has completed printing for all pages. If the printing for all pages is not completed (NO in step S806), the CPU 107 returns to step S803 to check the status. When the printing for all pages is completed (YES in step S806), the CPU 107 ends the job.

<Flowchart of Maintenance Screen Display Processing>

Figure 9:
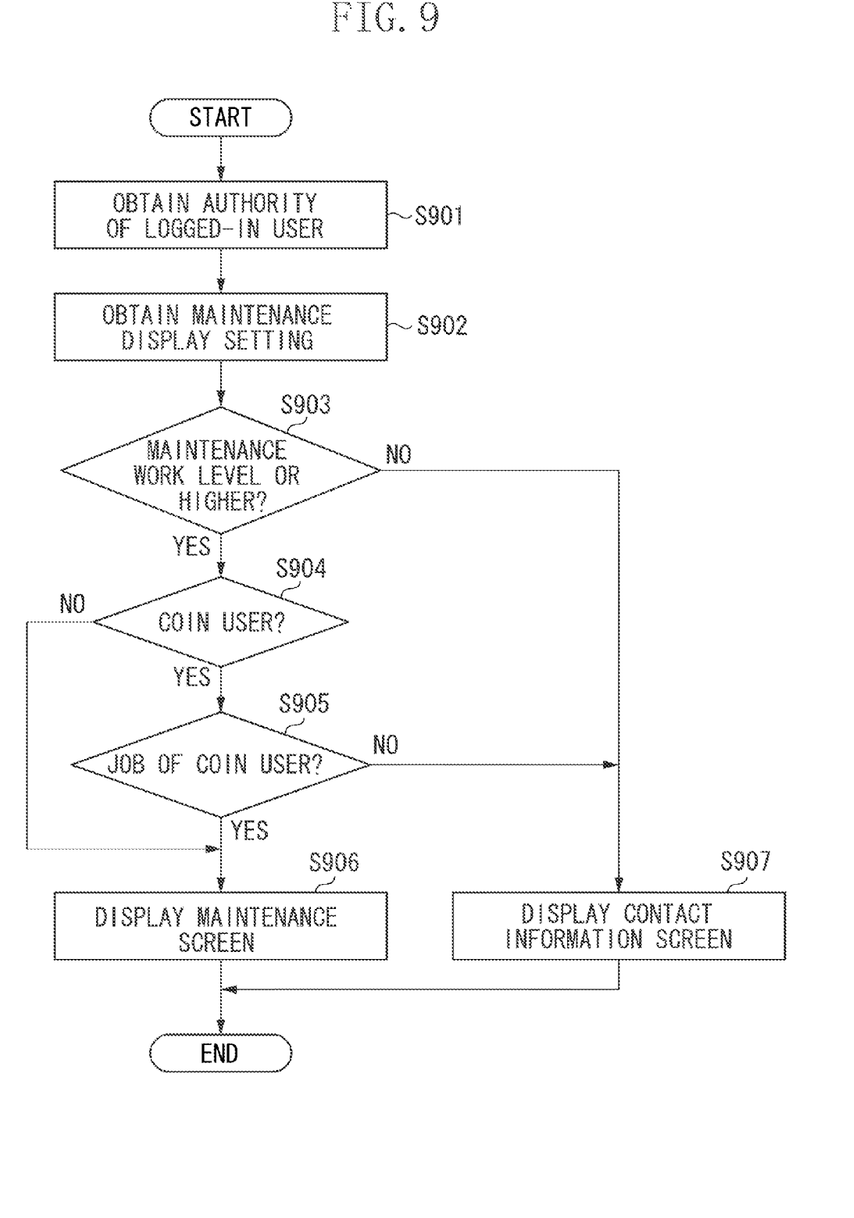
FIG. 9 is a flowchart illustrating maintenance screen display processing.

FIG. 9 is a flowchart illustrating the details of the processing in step S807. In step S901, the UI control unit 202 obtains the authority of the current logged-in user from the user management control unit 204. In other words, the UI control unit 202 determines whether the user logging in to the image forming apparatus 101 is the system administrator, the general user, or the coin user.

Next, in step S902, the UI control unit 202 obtains, from the storage device control unit 203, the maintenance display setting set on the screen illustrated in any of FIGS. 7A, 7B, and 7C.

Subsequently, in step S903, the UI control unit 202 determines whether the authority (the system administrator, the general user, or the coin user) of the logged-in user is at the maintenance work level for handling the type of the error that has currently occurred, or higher.

For example, if the currently logged-in user is the coin user, and the general user is set as the maintenance work level for handling the error that has currently occurred, the UI control unit 202 determines that the authority of the logged-in user is below the maintenance work level (NO in step S903). If the currently logged-in user is the general user, and the system administrator is set as the maintenance work level for handling the error that has currently occurred, the UI control unit 202 determines that the authority of the logged-in user is below the maintenance work level (NO in step S903).

On the other hand, if the current logged-in user is the general user, and the general user is set as the maintenance work level for handling the error that has currently occurred, the UI control unit 202 determines that the authority of the logged-in user is at the maintenance work level or higher (YES in step S903). If the current logged-in user is the system administrator, the UI control unit 202 determines that the authority of the logged-in user is at the maintenance work level or higher (YES in step S903), regardless of the set maintenance work level.

Figure 10A:
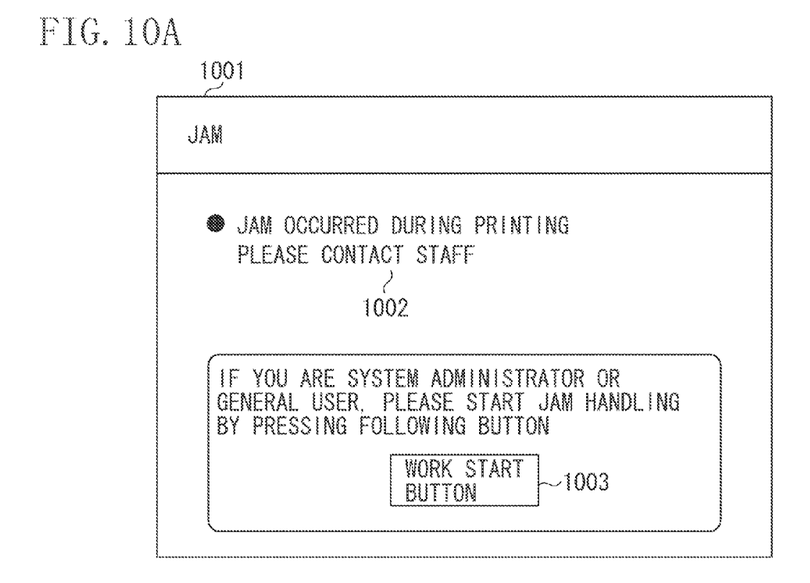
FIGS. 10A and 10B each illustrate a jam handling screen of the operation unit.
Figure 10B:
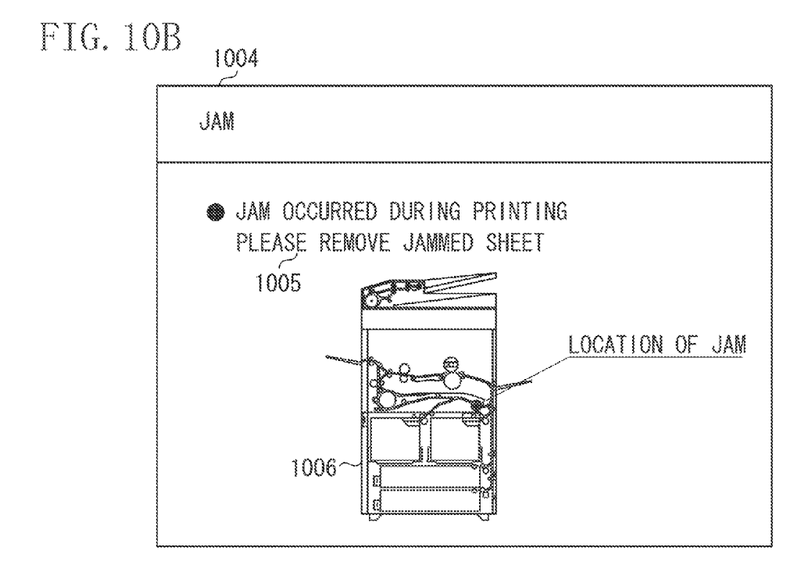

In this way, in step S903, the UI control unit 202 determines whether the logged-in user is at the maintenance work level, based on the authority of the logged-in user and the set maintenance work level. When the logged-in user is below the maintenance work level (NO in step S903), the current user cannot perform the maintenance and the UI control unit 202 proceeds to step S907. In step S907, the UI control unit 202 causes the display unit 103 to display a contact information screen. Specifically, the display unit 103 displays a screen as illustrated in FIG. 10A. This will be described in detail below. On the other hand, when the logged-in user is at the maintenance work level or higher (YES in step S903), the UI control unit 202 proceeds to step S904. In step S904, the UI control unit 202 determines whether the logged-in user is the coin user. When the logged-in user is the coin user (YES in step S904), the UI control unit 202 proceeds to step S905. In step S905, the UI control unit 202 determines whether the active job is a job of the coin user, to determine whether the error that has occurred is an error attributable to the job of the coin user. When the active job is not the job of the coin user (NO in step S905), the coin user, i.e., the customer is caused to carry out the work of the staff. Therefore, in step S907, the UI control unit 202 causes the display unit 103 to display the contact information screen. When the logged-in user is not the coin user (NO in step S904) or when the active job is the job of the coin user (YES in step S905), the UI control unit 202 proceeds to step S906. In step S906, the UI control unit 202 causes the display unit 103 to display a maintenance screen. Specifically, the display unit 103 displays a screen as illustrated in FIG. 10B. After displaying the screen in either step S906 or step S907, the processing ends.

<Details of Contact Information Screen and Maintenance Screen>

FIG. 10A illustrates a contact information screen 1001 to be displayed at the occurrence of a jam. The contact information screen 1001 includes a message 1002 and a work start button 1003. The message 1002 displays a character string set in the contact information display 704 of the maintenance display setting screen 701. The work start button 1003 is provided for a maintenance worker. In this example, the system administrator or the general user is assumed to press the work start button 1003. Pressing the work start button 1003 causes a shift to a screen illustrated in FIG. 10B.

FIG. 10B illustrates a maintenance screen 1004 to be displayed at the occurrence of a jam. The maintenance screen 1004 includes a message 1005 and a jam location display 1006. The message 1005 prompts removal of a jammed sheet. The jam location display 1006 indicates the location of the current jam.

Through the above processing, in the environment where customers use the image forming apparatus 101 via the coin vender, and the staff use the image forming apparatus 101 with IDs and passwords, if a situation that requires maintenance occurs, the image forming apparatus 101 can display how to handle the situation appropriately on the display unit 103.

Further, the exemplary embodiment of the present invention is implemented also by executing the following processing. First, software (a program) for implementing the functions of the exemplary embodiment described above is supplied to a system or an apparatus via a network or any of various storage media. Next, a computer (alternatively, a CPU, a micro processing unit (MPU), or the like) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267146 filed Dec. 25, 2013, which is hereby incorporated by reference herein in its entirety.

What is claimed is:

1. An image forming apparatus comprising:
   a receiving unit configured to receive authentication information;
   a control unit configured to allow use of the image forming apparatus in a case where a user is authenticated based on the authentication information received by the receiving unit, wherein the control unit is configured to allow use of the image forming apparatus also in a case where money is inserted in a charging apparatus connected to the image forming apparatus;
   an image forming unit configured to form an image on a sheet;
   a detection unit configured to detect sheet jam during forming the image on the sheet; and
   a display unit configured to display, in a case where use of the image forming apparatus has been allowed as a result of the user being authenticated, a first error screen based on the sheet jam detected by the detection unit, and in a case where use of the image forming apparatus has been allowed as a result of money being inserted in the charging apparatus, display a second error screen based on the sheet jam detected by the detection unit,
   wherein, on the first error screen, a message notifying the user of occurrence of the sheet jam and indicating that removal of a jammed sheet is necessary is displayed in addition to display of a position of the sheet jam, and
   wherein, on the second error screen, a message notifying the user of occurrence of the sheet jam is displayed, without display of a position of the sheet jam.

2. The image forming apparatus according to claim 1, further comprising a setting unit configured to set a message to be displayed by the display unit,
   wherein the message set by the setting unit is displayed on the second error screen.

3. The image forming apparatus according to claim 1, wherein contact information for getting in touch with a maintenance worker is displayed on the second error screen.

4. A method for controlling an image forming apparatus, the method comprising:

receiving authentication information;

performing control to allow use of the image forming apparatus in a case where a user is authenticated based on the received authentication information, and to allow use of the image forming apparatus also in a case where money is inserted in a charging apparatus connected to the image forming apparatus;

forming an image on a sheet;

detecting sheet jam during forming the image on the sheet; and displaying, in a case where use of the image forming apparatus has been allowed as a result of the user being authenticated, a first error screen based on the detected sheet jam, and in a case where use of the image forming apparatus has been allowed as a result of money being inserted in the charging apparatus, displaying a second error screen based on the detected sheet jam, wherein, on the first error screen, a message notifying the user of occurrence of the sheet jam and indicating that removal of a jammed sheet is necessary is displayed in addition to display of a position of the sheet jam, and wherein, on the second error screen, a message notifying the user of occurrence of the sheet jam is displayed, without display of a position of the sheet jam.

5. A non-transitory computer-readable storage medium storing a program for causing a computer to execute a method for controlling an image forming apparatus, the method comprising:

receiving authentication information;

performing control to allow use of the image forming apparatus in a case where a user is authenticated based on the received authentication information, and to allow use of the image forming apparatus also in a case where money is inserted in a charging apparatus connected to the image forming apparatus;

forming an image on a sheet;

detecting sheet jam during forming the image on the sheet; and displaying, in a case where use of the image forming apparatus has been allowed as a result of the user being authenticated, a first error screen based on the detected sheet jam, and in a case where use of the image forming apparatus has been allowed as a result of money being inserted in the charging apparatus, displaying a second error screen based on the detected sheet jam, wherein, on the first error screen, a message notifying the user of occurrence of the sheet jam and indicating that removal of a jammed sheet is necessary is displayed in addition to display of a position of the sheet jam, and wherein, on the second error screen, a message notifying the user of occurrence of the sheet jam is displayed, without display of a position of the sheet jam.

* * * * *